United States Patent

Heine et al.

[11] Patent Number: 5,874,170
[45] Date of Patent: Feb. 23, 1999

[54] SEAL FOR MOVABLE STRUCTURAL COMPONENTS

[75] Inventors: Steffen Heine, Stadt Wehlen; Michael Kinzel, Badendorf; Heiko Schumacher, Bad Oldesloe, all of Germany

[73] Assignee: Dichtungstechnik G. Bruss & Co. KG, Germany

[21] Appl. No.: 560,145

[22] Filed: Nov. 17, 1995

[30] Foreign Application Priority Data

Nov. 25, 1994 [DE] Germany .......................... 44 42 081.1

[51] Int. Cl.$^6$ .............................. B32B 27/00; F16J 15/16
[52] U.S. Cl. ...................... 428/422; 428/411.1; 428/119; 428/192; 428/66.4; 428/133; 428/157; 277/650; 277/922; 277/946
[58] Field of Search ................................ 428/422, 57, 60, 428/133, 139, 157, 161, 192, 411.1, 66.4, 119, 120; 277/228, 229, DIG. 6, 31, 81 R, 82, 92, 650, 922, 924, 936, 945, 946

[56] References Cited

U.S. PATENT DOCUMENTS

| | | | |
|---|---|---|---|
| 2,717,025 | 9/1955 | Jelinek | 277/229 |
| 4,124,676 | 11/1978 | Henzl | 264/250 |
| 4,147,824 | 4/1979 | Dettmann et al. | 428/65 |
| 4,898,638 | 2/1990 | Lugez | 156/272.6 |
| 5,112,664 | 5/1992 | Waterland, III | 428/76 |
| 5,198,053 | 3/1993 | Duncan | 156/64 |

FOREIGN PATENT DOCUMENTS

| | | |
|---|---|---|
| 43423B | 12/1989 | Austria . |
| 3329386 | 11/1984 | Germany . |
| 2753170 | 7/1986 | Germany . |
| 3619309 | 9/1987 | Germany . |
| 3710403 | 10/1988 | Germany . |
| 3732360 | 4/1989 | Germany . |
| 3739514 | 6/1989 | Germany . |
| 3641060 | 11/1989 | Germany . |
| 3641209 | 6/1990 | Germany . |

OTHER PUBLICATIONS

English translation for DE 3710403 A1, Haldenwang et al. Oct. 6, 1988.

*Primary Examiner*—Marie Yamnitzky
*Attorney, Agent, or Firm*—Rogers & Killeen

[57] ABSTRACT

A seal for movable structural components, such as piston rods or shafts, includes a carrier body made of plastics and a sealing member made of polytetrafluoroethylene (PTFE) material and bonded to the carrier body. A plastic material may be mixed with the PTFE and fused to the plastic carrier body during injection molding.

5 Claims, 4 Drawing Sheets

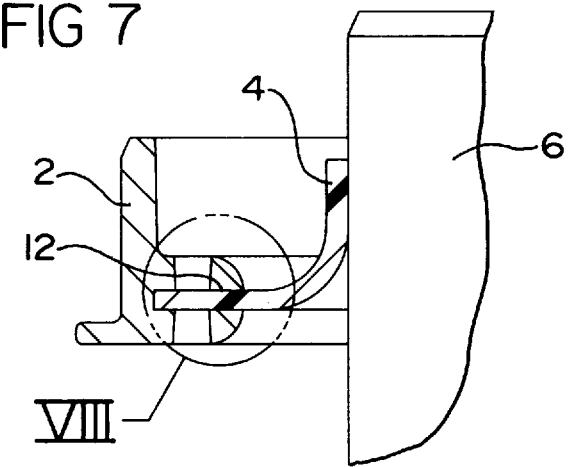
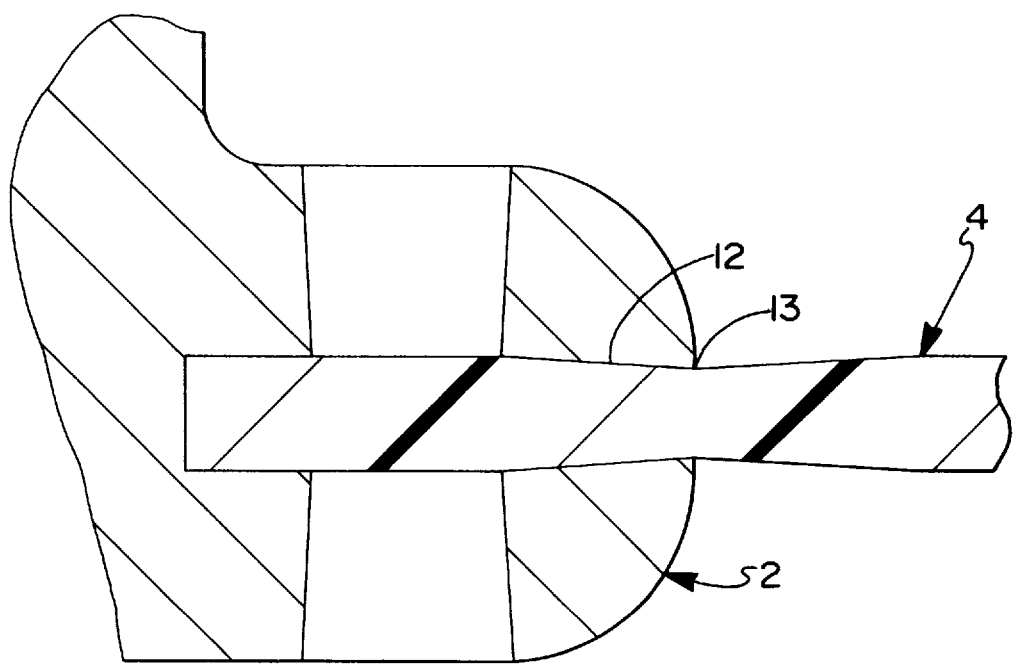

SEAL FOR MOVABLE STRUCTURAL COMPONENTS

BACKGROUND OF THE INVENTION

1. Field of the invention

The instant invention relates to a seal for movable structural components, such as piston rods and shafts.

2. Description of Prior Development

In the case of a known seal of this type (DE-OS 24 60 185) the sealing member is clamped in force lock between two metal parts, with the interposition of a rubber sealing disc.

EP 0 615 085 discloses an integrated shaft sealing ring which comprises a carrier body in the form of light die cast metal and a sealing member made of polytetrafluoroethylene (PTFE) and vulcanized to the carrier body through an elastomer.

Likewise known is a seal (U.S. Pat. No. 5,198,053) in which a sealing member made of PTFE material is connected to a metallic stiffening ring through an intermediate layer of perfluoropolymers (FEP).

The anti-adhesive properties of PTFE material make it very suitable for a contact seal where it is demanded that there be little friction between the sealing member and the structural component which is moved with respect to the same either in rotation or translation. These anti-adhesive properties, however, frequently cause poor adherence to a carrier body of the seal so that it becomes extremely difficult to make the connection to the carrier body.

In the prior art, therefore, the PTFE sealing members always are joined to their carrier bodies by primers which act as intermediaries and thus present additional component parts requiring expensive pretreatment for connection to the PTFE sealing member.

SUMMARY OF THE INVENTION

It is an object of the invention to provide a seal, comprising a carrier body and a PTFE sealing member, with which a direct and durable connection between the carrier body and the sealing member can be made in a simple manner.

A further object is to provide a method of manufacturing such a seal.

These objects are met, in accordance with the invention.

A further development of the invention is especially advantageous in which there is a form-lock connection (mechanical-lock) in addition to the substance-lock connection (bond). It is obtained by a further development of the method according to the invention by which the sealing member is deformed permanently, as the injection mold is closed, so as to provide an undercut behind which plastic material of the carrier body will flow during the subsequent injection.

BRIEF DESCRIPTION OF THE DRAWINGS

The invention will be described further, by way of example, with reference to the accompanying drawings, in which:

FIG. 7 shows a seal according to the invention as illustrated in FIG. 2, but with a form-lock connection between the sealing member and the carrier body;

FIG. 8 shows the cutout marked VIII in FIG. 7 on an enlarged scale;

DESCRIPTION OF THE PREFERRED EMBODIMENTS

Figure 1:
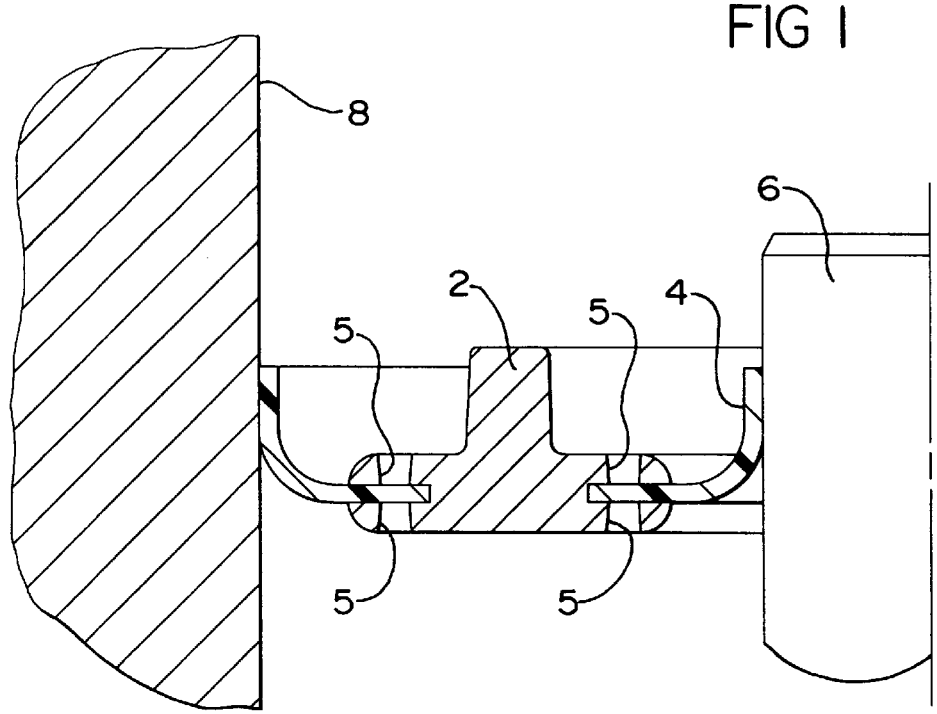
FIG. 1 is an axial semisection of a seal for a piston rod of a piston.
Figure 10:
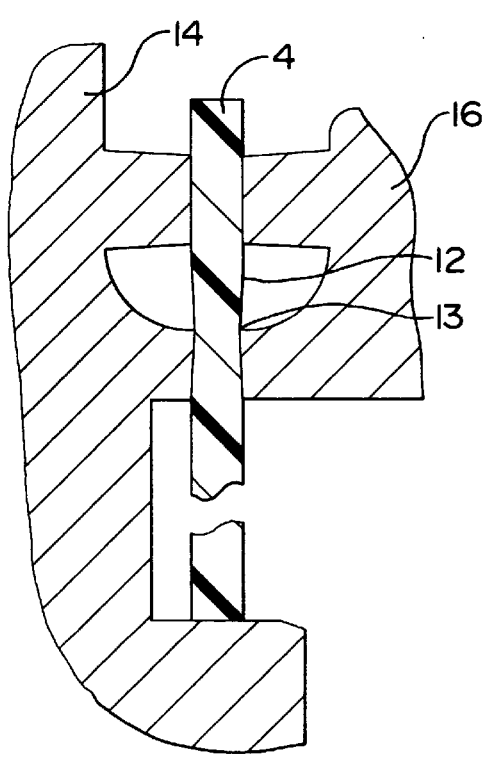
FIGS. 9 and 10 illustrate two stages in the manufacture of a seal as shown in FIGS. 7 and 8, FIG. 9 illustrating a mold, with an inserted PTFE sealing member, in open position, and FIG. 10 illustrating the mold in closed position.
Figure 9:
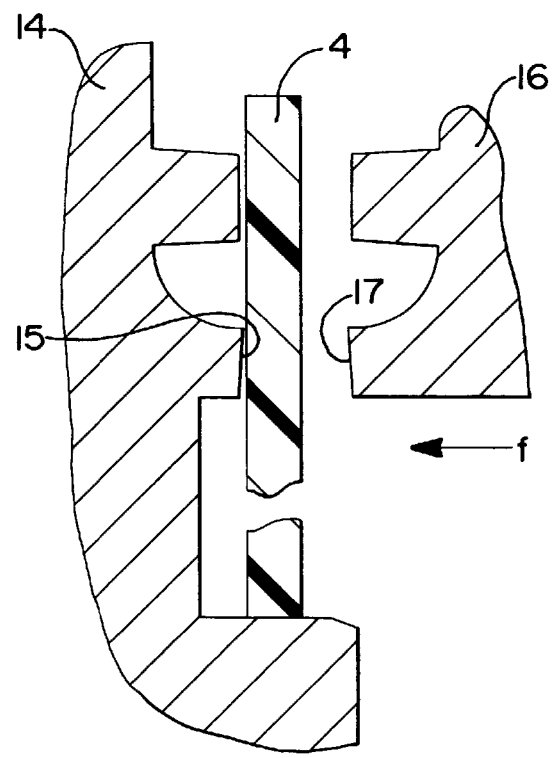
Figure 3:
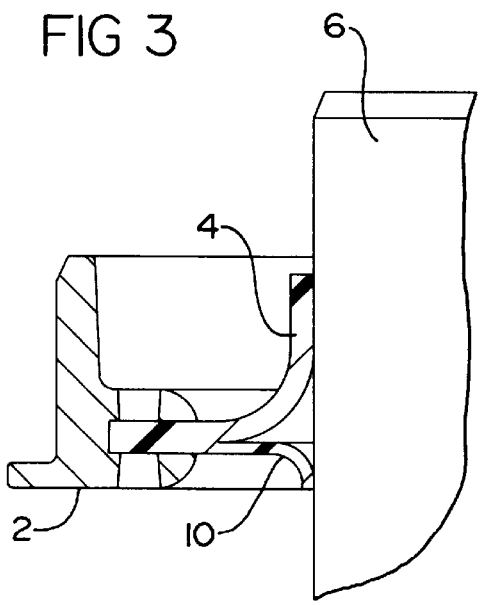
FIGS. 2 to 5 show different embodiments of seals for shafts, each in axial semisection.
Figure 4:
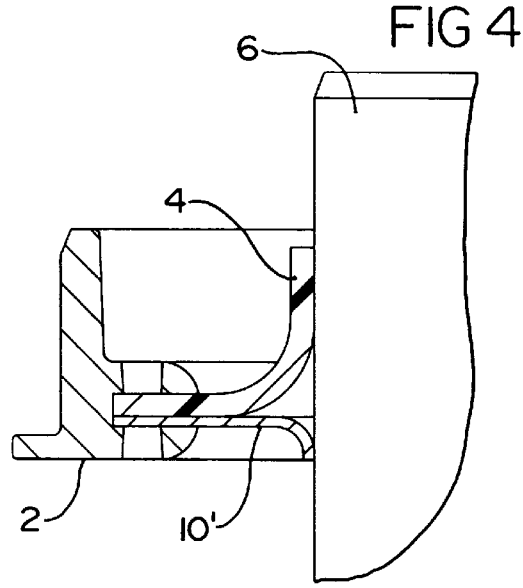
Figure 2:
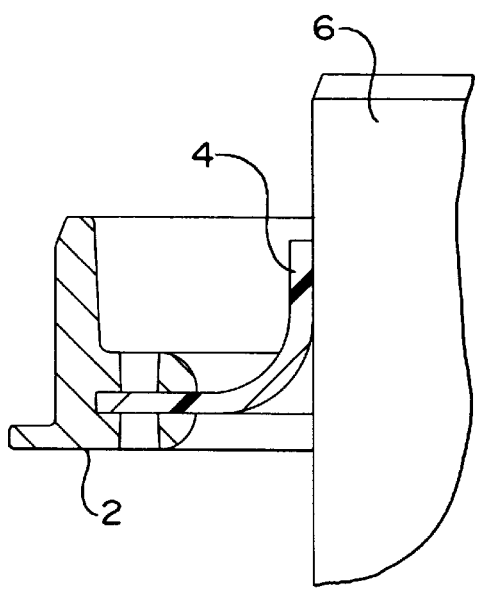
Figure 5:
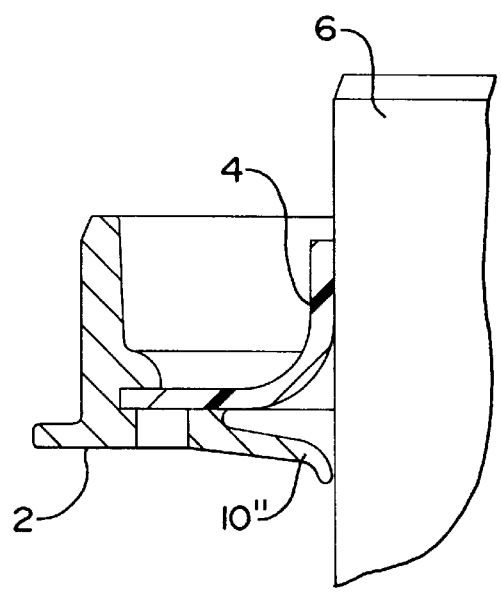
Figure 6:
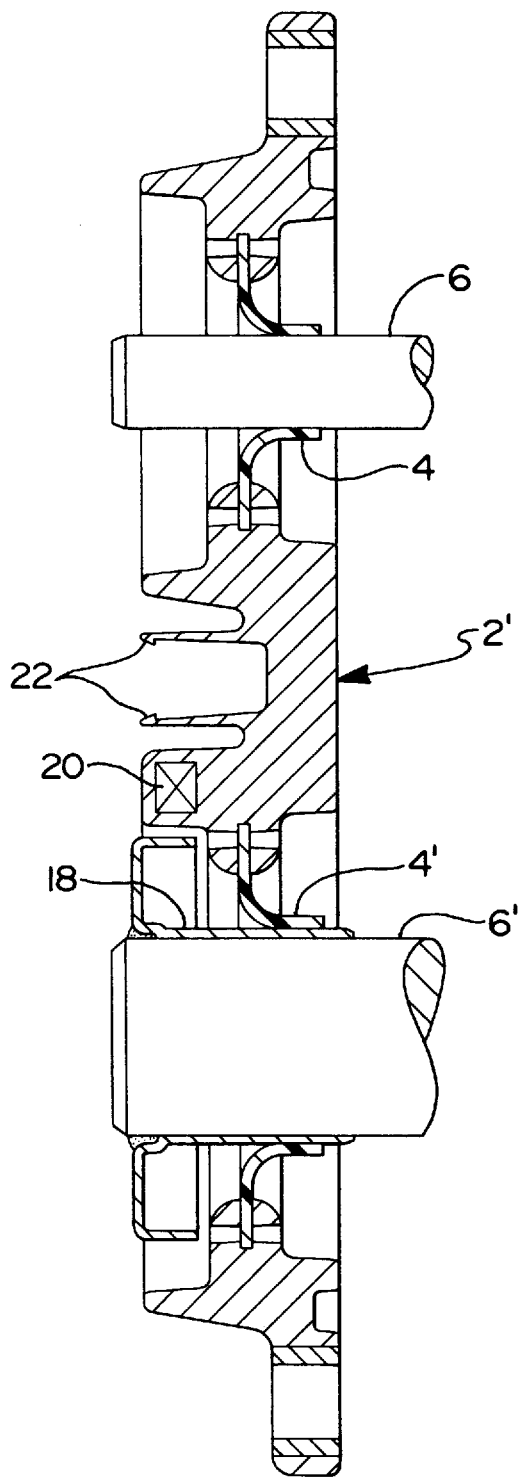
FIG. 6 is an axial sectional elevation of an integrated seal for two parallel shafts according to the invention.

For the sake of simplicity, like reference numerals are used throughout the drawings to mark parts which are identical or have the same functions, more specifically 2 and 2' designate a carrier body made of plastics; 4 and 4' designate a sealing member made of polytetrafluoroethylene (PTFE) compound material (PTFE plastic material modified by such fillers as are customary for sealing purposes); 5 designates slightly conical bores resulting from pins for axially fixing the sealing member 2 in an injection mold; 6 designates a movable component which is intended to be sealed—in FIG. 1 a piston rod supported for translatory movement, in FIGS. 2 to 5 and 7 rotary shafts 6, a second shaft to be sealed being marked 6' in FIG. 6; 8 designates a cylinder wall in FIG. 1; 10 designates a protective lip which is integrally formed with the sealing member in FIG. 3; 10' designates a contacting protective lip provided separately from the sealing member 4 in FIG. 4; 10" designates a contactless protective lip as part of the carrier body 2 in FIG. 5; 12 designates a slightly V-shaped constriction or undercut in sealing member 4' according to FIGS. 7 and 8; 13 designates a stamping edge as the deepest place of the undercut 12 at the radially inner edge of the carrier body in FIGS. 7 and 8; 14 and 16 designate two mold parts of a mold which are movable with respect to each other to stamp the undercut 12 upon closing of the mold 14, 16 according to FIG. 10 in the direction of arrow f according to FIG. 9; 15 and 17 in FIG. 9 designate facets of the mold parts 14 and 16, respectively; 18 designates a race mounted on the second shaft 6' in FIG. 6 and sealed by a second sealing member 4' which is seated in the same carrier body 2'; 20 designates a sensor or actor inserted in the carrier body 2'; shown in FIG. 6; 22 designates snap connectors formed integrally at the carrier body 2' for connection of another component part, not illustrated in the drawing.

A substance-lock connection between the plastic material of the sealing member 4, 4' and the plastic material of the carrier body 2, 2' is obtained by adding to the PTFE compound material of the sealing member a small quantity of the plastic material of which the carrier body is made, or of another substance, especially plastics, which is compatible with the plastic material of the carrier body.

Experiments have shown that at least 0.3% by weight and at most 40% by weight of the plastic material of the carrier body should be added to the PTFE material of the sealing member. The best results both in terms of good sealing properties of the sealing member and a good connection in substance lock were achieved with an addition of from 5 to 10% by weight. Plastics which proved to be especially well suited to be admixed to the PTFE compound material of the sealing member include polyphenylenesulfide (PPS), polyamide (PA), and polyethylene (PE). The associated carrier bodies in each case consisted of the respective PPS, PA, or PE. The plastics used for the carrier body and the material mixed with the sealing member need not be identical; they merely must be compatible in the sense of making the substance-lock connection. For example, PE may be added to the PTFE compound material of the sealing member, while the carrier body is injection molded of PA.

Instead of admixing the plastic materials mentioned, the surface of the PTFE sealing member 4 may be modified by incorporation of the plastic material of which the carrier is made or of a plastic material compatible with the same. To accomplish that, the plastic material in question is applied by vapor deposition or plasma polymerization on the surface of the sealing member 4. Preferably, the surface is modified only in that partial area which will be connected directly in substance lock (bond) to the carrier body 2. To that end, the sealing member is simply masked during the vapor deposition or plasma-polymerization, with the exception of the partial area in question.

Simple degreasing is sufficient, and the environmentally objectionable, expensive etching of the PTFE sealing member may be dispensed with.

In any case, the sealing member having been modified by the admixture or surface treatment described, is placed in the injection mold to produce the seal. Upon closing of the mold, the plastic material which will form the carrier body is injected into the mold. During this time the sealing member fuses to the plastics of the carrier body as it cools, thereby providing a durable bonded connection in substance lock.

Simultaneously with the closing of the injection mold, the undercut 12 shown in FIG. 8 may be produced in the manner illustrated in FIGS. 9 and 10 by pressing together the mold parts 14, 16 which are formed with facets 15 and 17, respectively. The deepest place of the undercut 12 results at the edge of the carrier body 2 facing the shaft 6 and takes the form of a step or stamping edge 13 (FIG. 8). During the subsequent injection molding, the undercut thus formed is filled with the carrier body plastics so that a connection in form lock is established in addition to the substance-lock (mechanical lock) connection between the carrier body 2 and the PTFE sealing member. In testing, an undercut as embodied in FIG. 8 provided the best results as regards static tightness which is difficult to achieve.

If a connection in form lock is made, the substance-lock connection may be dispensed with, and vice versa.

What is claimed is:

1. A seal for relatively movable structural components comprising:

a carrier body made of plastic material which is suitable for injection molding; and a sealing member made of polytetrafluoroethylene (PTFE) compound material which seals through contact with respect to one of said relatively movable structural components, the composition of the PTFE compound material of said sealing member being modified at least in its surface to include between about 0.3% and about 40% by weight of a first material compatible with said carrier body so that the surface of said sealing member is directly bonded to said carrier body.

2. The seal of claim 1, wherein said surface is directly bonded to said carrier body by fusion of said surface to the carrier body during the injection molding of said carrier body.

3. The seal of claim 1, wherein of said first material added to said sealing member is between about 5% and about 10% by weight.

4. The seal of claim 1, wherein said sealing member is connected in form lock to said carrier body.

5. The seal claim 4, wherein said form lock includes an undercut in said sealing member, which has a deepest place in the form of a stamping edge located at the edge of said carrier body.

* * * * *